US006776423B1

(12) United States Patent
Guht

(10) Patent No.: US 6,776,423 B1
(45) Date of Patent: Aug. 17, 2004

(54) SEALING DEVICE FOR A DOOR OR A WINDOW

(75) Inventor: Detlev Guht, Arnsberg (DE)

(73) Assignee: Ernst Keller GmbH & Co. KG, Arnsberg (DE)

( * ) Notice: Subject to any disclaimer, the term of this patent is extended or adjusted under 35 U.S.C. 154(b) by 0 days.

(21) Appl. No.: 10/430,065

(22) Filed: May 6, 2003

(51) Int. Cl.[7] .............................. F16J 15/02; E06B 7/28

(52) U.S. Cl. ........................ 277/628; 277/637; 277/644; 49/306; 49/314; 49/308

(58) Field of Search ................................ 277/628, 637, 277/644, 646–647; 49/303–305, 310–311, 313–314, 489

(56) References Cited

U.S. PATENT DOCUMENTS

| | | | | |
|---|---|---|---|---|
| 197,056 A | * 11/1877 | Rowlett | ........................ | 49/314 |
| 1,861,612 A | * 6/1932 | Reynolds | ...................... | 49/314 |
| 2,694,234 A | * 11/1954 | Roby et al. | .................... | 49/383 |
| 2,929,116 A | * 3/1960 | Isbister | ......................... | 49/314 |
| 4,528,775 A | * 7/1985 | Einarsson | ..................... | 49/306 |
| 6,253,493 B1 | * 7/2001 | Sauve | .......................... | 49/470 |

FOREIGN PATENT DOCUMENTS

| | | |
|---|---|---|
| DE | 28 15 244 | 10/1979 |
| EP | 0044559 A1 * | 1/1982 |

* cited by examiner

*Primary Examiner*—Anthony Knight
*Assistant Examiner*—Vishal Patel
(74) *Attorney, Agent, or Firm*—Collard & Roe, P.C.

(57) ABSTRACT

A device for sealing a gap between a door and a floor or between a window and a window frame comprises a deformable sealing element that seals the gap when the door or window is closed, and an L-shaped activation rail attached to the sealing element and having a vertical shank and a horizontal shank. The sealing element is attached at a free end of the horizontal shank. The activation rail engages with a door frame, or window frame. The activation rail is pivoted when the door or window is being closed and causes the sealing element to engage the floor or window frame. There is an attachment rail for affixing the sealing element to a door or window and arranged on a first side wall of the attachment rail. The attachment rail has an L-shaped cross section, and the sealing element is arranged between the activation rail and a second side wall of the attachment rail. The activation rail is joined to an upper end of an upright-standing shank of the attachment rail.

10 Claims, 3 Drawing Sheets

SEALING DEVICE FOR A DOOR OR A WINDOW

BACKGROUND OF THE INVENTION

1. Field of the Invention

This invention relates to a sealing device for a door or window to seal a gap between the door or window and the floor or frame when the door or window is closed.

2. The Prior Art

Sealing devices for doors are generally known, which allow automatic sealing of the gap between the underside of the door body and the floor, when the door is being closed. Here, a movable sealing lip is inserted into a groove on the underside of the door body, and pressed against the floor when the door is closed, by an activation device, using a spring force, so as to seal the gap between the door body and the floor when the door is closed. The activation device thus has an activation element that extends laterally out of the groove of the door body. During the closing process, the activation element enters into contact with the door frame and is pressed into the groove. The sealing lip is thus brought into a sealing position by the activation device.

In order to install this sealing device, it is necessary to make a groove in the underside of the door body in order to insert the sealing lip with the activation device. However, this sealing device cannot be used to achieve a seal all around a door or a window, since this is prevented by the activation element, which extends laterally out of the groove.

A sealing device is known from German Patent No. DE 28 15 244 A1, which shows a sealing element for sealing a gap between the panel of a door and a floor. The sealing element is driven by an actuation element into a position in which it closes the gap when the door is closed if the actuation element engages a bricked-in door frame. The actuation element, which is designed as an actuation rail, is arranged on a first longitudinal side of the fastening rail, and is adapted to swivel when the door is closed. A deformable sealing element is arranged between the actuation rail and a second longitudinal side of the fastening rail.

The elements of the sealing device are located in this connection in a U-shaped protective casing and, when the door is closed, are pressed (or forced) out of the protective casing by a pressure bar. In this connection, the casing may either be inserted in a U-shaped recess of the bottom side of the door panel, or, if the U-shaped casing is to be secured below the door panel, the door panel has to be shortened accordingly. It is difficult to implement either way at a later time on a door that has already been installed.

SUMMARY OF THE INVENTION

The present invention provides a sealing device that can be easily attached to an installed door or a window, without any of the problems of the prior art devices.

The invention solves the problems of the prior art by providing a device in which the fastening rail and the actuation rail each have an L-shaped cross section, whereby the standing leg of the actuation rail is articulated on the upper end of an upright leg of the fastening rail arranged on the door, and the sealing element is secured on the free end of the lying leg o the actuation rail.

This measure permits mounting the entire sealing device on an existing door at a later time without having to mill a deepening or damaging the door. If such a sealing device is mounted on an existing door by means of gluing or screws, it can be easily removed again, if necessary. No change is required on the existing door for applying the invention because the L-shaped components of the seal are arranged laterally at the bottom or on the underside of the door, which is particularly shown by the figures.

In the invention, a sealing device is attached to a door or a window and can be used to seal a gap between the door body and a floor or a window and a window frame. The sealing element can be brought into a position that seals off the gap when the door is closed, by means of an activation element, when the activation element is engaged with the door frame. In the invention, the sealing device has an attachment rail for affixing it to a door body or a window, and the activation element, which is designed as an activation rail, is arranged on a first side wall of the attachment rail. The activation rail can be pivoted when the door or window is closed. A deformable sealing element is disposed between the activation rail and a second side wall of the attachment rail. In this way, not only can a gap between the underside of the door body and a floor be sealed, but also a gap between the door body and the door frame can be sealed. In addition, a gap between a window and its frame, which gap goes completely around, can also be sealed with the sealing device according to the invention.

Preferably, the attachment rail is structured to be L-shaped in cross-section and is jointed onto the upper end of an upright-standing shank of the attachment rail arranged on a door.

In a preferred embodiment, the activation rail is structured to be L-shaped in cross-section, with a vertical shank and a horizontal shank, and the sealing element is attached at the free end of the horizontal shank. In this way, the attachment rail can be attached to the door body, while the sealing element is arranged on the underside of the door body.

In a preferred embodiment, the activation rail is biased with spring force relative to the attachment rail, so that the sealing element is biased when the door or the window is open, by means of the spring action of the spring elements, and does not close the gap, when the sealing element is compressed by the pivoted activation rail when the door or window is closed, and forms a dome.

Preferably, the attachment rail can be attached to a door or a window by means of gluing, in order to facilitate installation on an installed door or window.

In another embodiment, the activation rail has such a length that at least one end can be activated by contact against a frame as the door or the window is closed. In this way, the sealing element is brought into a position in which the gap is sealed only when the door or window is closed, and otherwise does not hinder opening and closing of the door.

In a preferred embodiment, the sealing element, the activation rail, and the attachment rail are extruded from plastic or aluminum, so that these components of the sealing device can be produced as endless parts, which can be cut to length as needed.

In another embodiment, the sealing element is a U-shapes dome when the activation rail is activated, so that even doors or windows with different gap heights or uneven floors can be reliably sealed.

In another embodiment, the sealing element has two rail elements, which are connected with one another so as to pivot, by means of a film joint. The first rail element is attached to the attachment rail so as to pivot, and the second rail element is attached to the activation rail so as to pivot, so that when the activation rail is activated, the rail elements are pivoted to stand at a V-shaped angle relative to one another. One of the two rail elements is extended beyond the film joint and thereby forms a contact seal, which is then pivoted along with the rail element, and thereby makes it possible to seal particularly high gap heights. Preferably, the activation rail and the attachment rail each have a groove, in which end segments of the sealing element can be attached. Other methods of attachment, such as gluing, bonding, etc., are also possible.

In another embodiment, the sealing element, the activation rail, and the attachment rail are made in one piece. Therefore, assembly of the individual components of the sealing device is not necessary, and only the spring elements have to be inserted and the adhesive strip, coated with adhesive, has to be applied, in order to complete the sealing device.

Since the activation element of an assembled sealing device only deforms the sealing element via contact with a door frame or a window frame, so that the gap is sealed, the seal does not slide along the floor, so that unevenness of the floor does not hinder opening and closing of the door.

Furthermore, any wear of the sealing device according to the invention is minimized in this way.

At the same time, the sealing device according to the invention is composed of simple components, which guarantee reliable function. These simple components can easily be extruded from high-strength plastic, or from aluminum, and then cut to length as needed. Therefore it is not necessary to produce and make available different components with different dimensions for doors of different widths. Assembly of the sealing device according to the invention is also particularly simple, since the sealing device according to the invention is glued onto a door body or window with the attachment rail.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
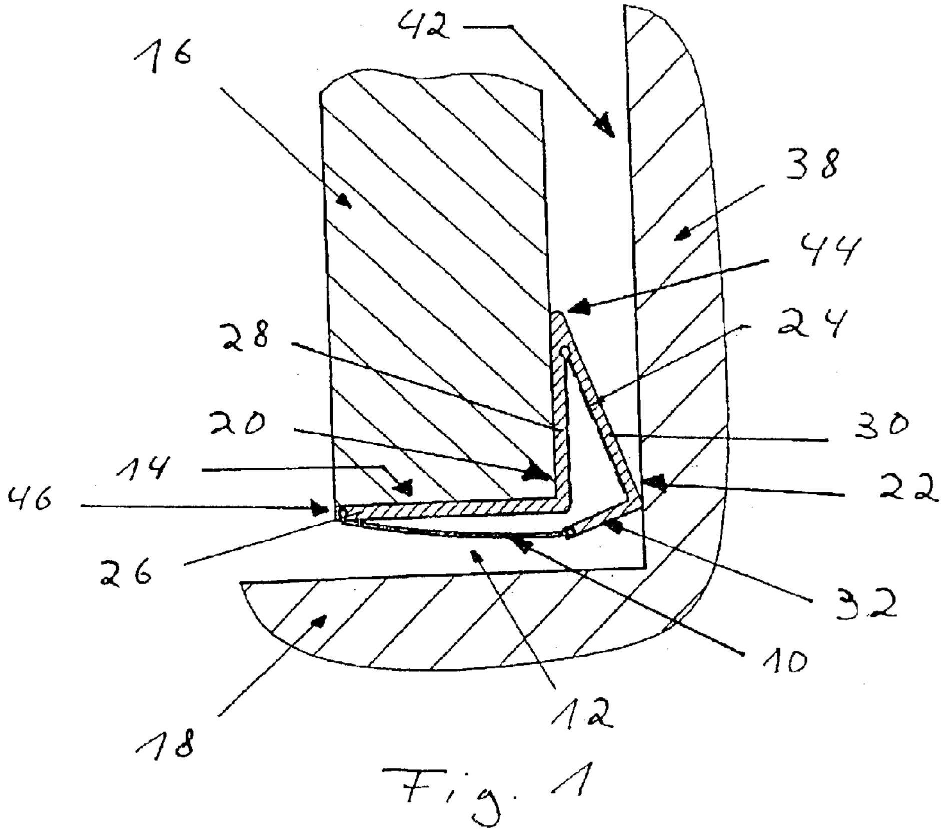
FIG. 1 shows a cross-sectional view through a slightly open door having a sealing device according to the invention.

Referring to FIG. 1, there is shown a door with a door body 16 in a slightly open position, whereby a gap 12 is present between underside 14 of door body 16 and the floor 18. The sealing device according to the invention is attached to door body 16. The device has an attachment rail 20 to be attached to door body 16, an activation rail 22, a strip-shaped sealing element 10 and two spring elements 24.

The sealing device is attached to door body 16 by means of attachment rail 20, which is L-shaped in cross-section, the first, horizontal shank 26 of which extends over the entire width and thickness of door body 16, and thereby completely covers the underside 14 of door body 16. The second shank 28 is attached to the front of door body 16, standing upright. Activation rail 22 is jointed onto a first side wall 44 at the upper end of upright-standing shank 28 of attachment rail 20, so as to pivot, while sealing element 10 is attached to a second side wall 46 at the end of the horizontal shank 26 of attachment rail 20. The joint has a groove that is curved in cross-section, into which a spring structured with a corresponding curvature engages, whereby the joint is encased so as to be sealed against dust, and therefore cannot become dirty. When plastic is used, the joint can also be structured as a film joint.

Activation rail 22 also has two shanks 30, 32. The first shank 30 is arranged to be vertical and second shank 32 is arranged to be horizontal. Thus, activation rail 22 is also structured to be L-shaped in cross-section. The length of vertical shank 30 of activation rail 22 is slightly greater than the length of vertical shank 28 of attachment rail 20. In contrast to this, the length of horizontal shank 26 of activation rail 22 is less than the length of horizontal shank 32 of activation rail 20, so that activation rail 22 engages only partially around door body 16. In order to bias activation rail 22 with spring force, spring elements 24 made of metal or plastic, which are V-shaped in cross-section, are inserted between vertical shank 30 of the activation rail 22 and the vertical shank 28 of attachment rail 20.

Sealing element 10 has broadened end segments on two opposite sides, so that it can be attached to attachment rail 20 and activation rail 22. For this purpose, a groove 34 is provided at the end of horizontal shank 32 and of activation rail 22, into which the first broadened end segment of the sealing element 10 is inserted. The opposite, second broadened end segment of sealing element 10 is inserted into a groove 36 on the end of horizontal shank 26 of attachment rail 20, so that sealing element 10 is stretched between the activation rail 22 and the attachment rail 20, since activation rail 22 is pivoted out in its rest position, by means of spring elements 24.

Figure 2:
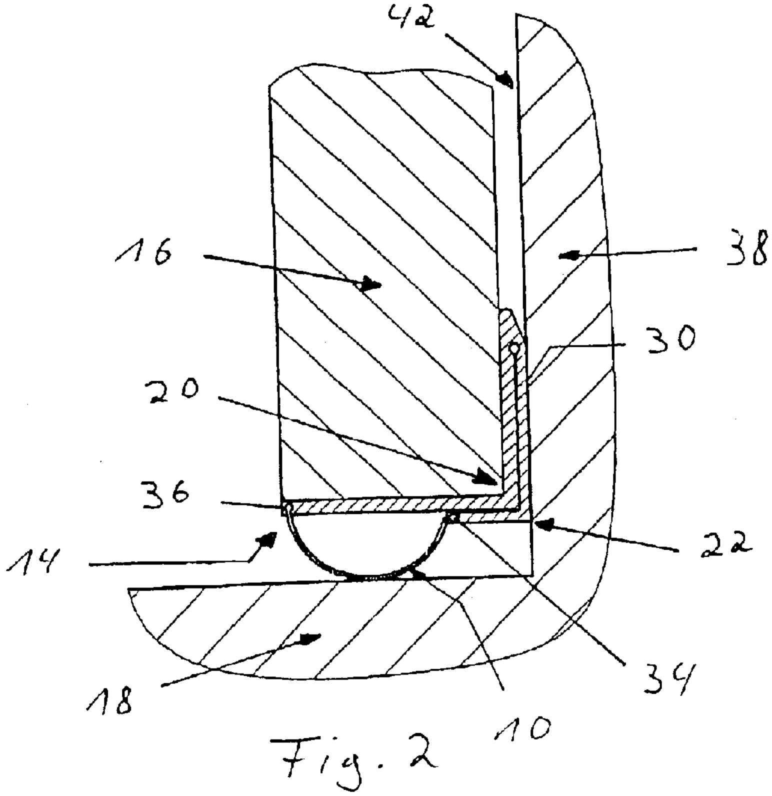
FIG. 2 shows a cross-sectional view through a closed door having a sealing device according to the invention.

FIG. 2 shows door body 16 in a closed position, in which gap 12 is sealed by means of sealing element 10. Vertical shank 30 of activation rail 22 makes contact with a contact surface 42 of a door frame 38 as the door is being closed, and is pressed against vertical shank 28 of attachment rail 20. As a result, activation rail 22 is pivoted so that shanks 30 and 32 of activation rail 22 come to rest against shanks 26, 28 of attachment rail 20. In this position, sealing element 10 is compressed by means of pivoted-activation rail 22, so that it becomes a U-shaped dome, and extends into gap 12 between door body 16 and floor 18, in order to seal it. The term doming characterizes both an arcing formation and a V-shaped or other shape of activated sealing element 10.

When the door is opened again, activation rail 22 is pivoted back into its rest position, shown in FIG. 1, because of the spring bias, and sealing element 10 is stretched, so that pivoting of the door is possible, without any hindrance of the pivoting movement of door body 16 caused by contact of sealing element 10 with floor 18.

Figure 3:
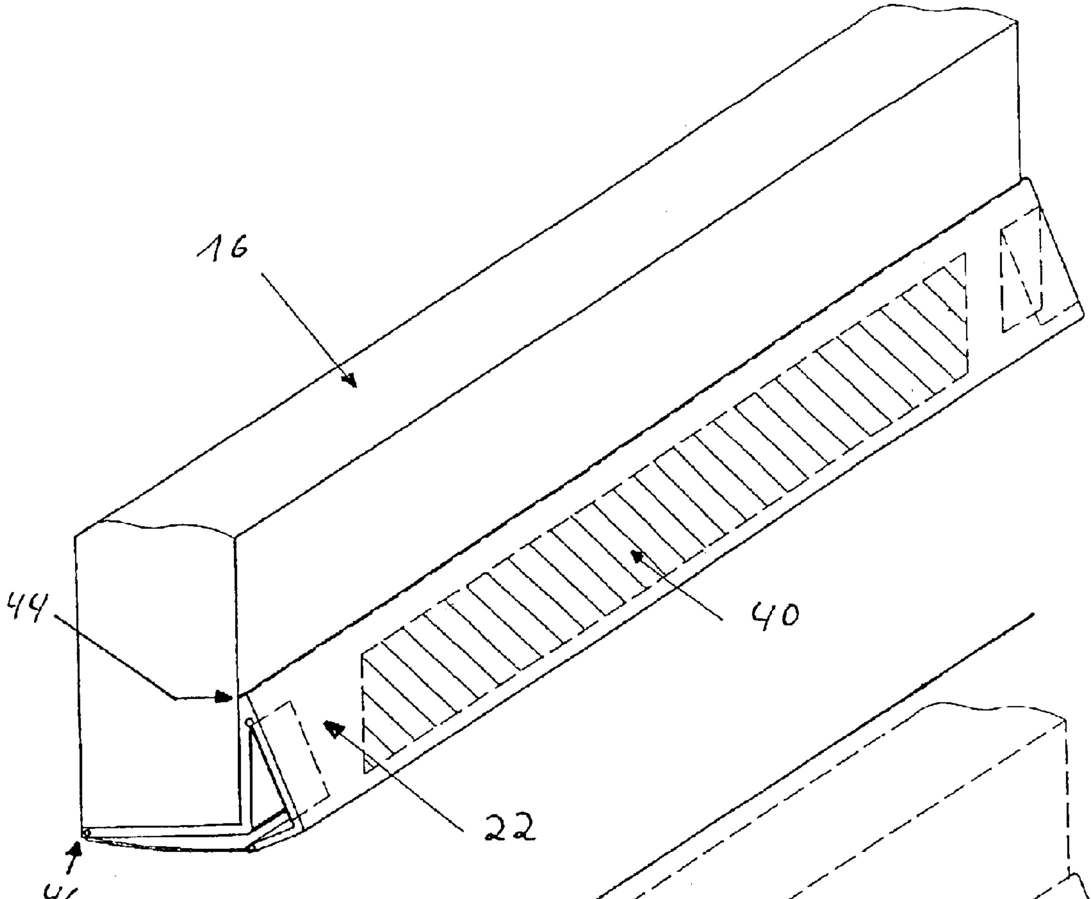
FIG. 3 shows a perspective view of a door body having a sealing device according to the invention.

FIG. 3 shows a door body 16 to which a sealing device according to the invention is attached. Spring elements 24 are inserted in the region of the two lateral ends of door body 16, between activation rail 22 and attachment rail 20. In order to simplify assembly of the sealing device, an adhesive strip 40 is attached at one side of attachment rail 20, which strip is coated with adhesive, in order to allow easy and problem-free attachment on door body 16.

Figure 4:
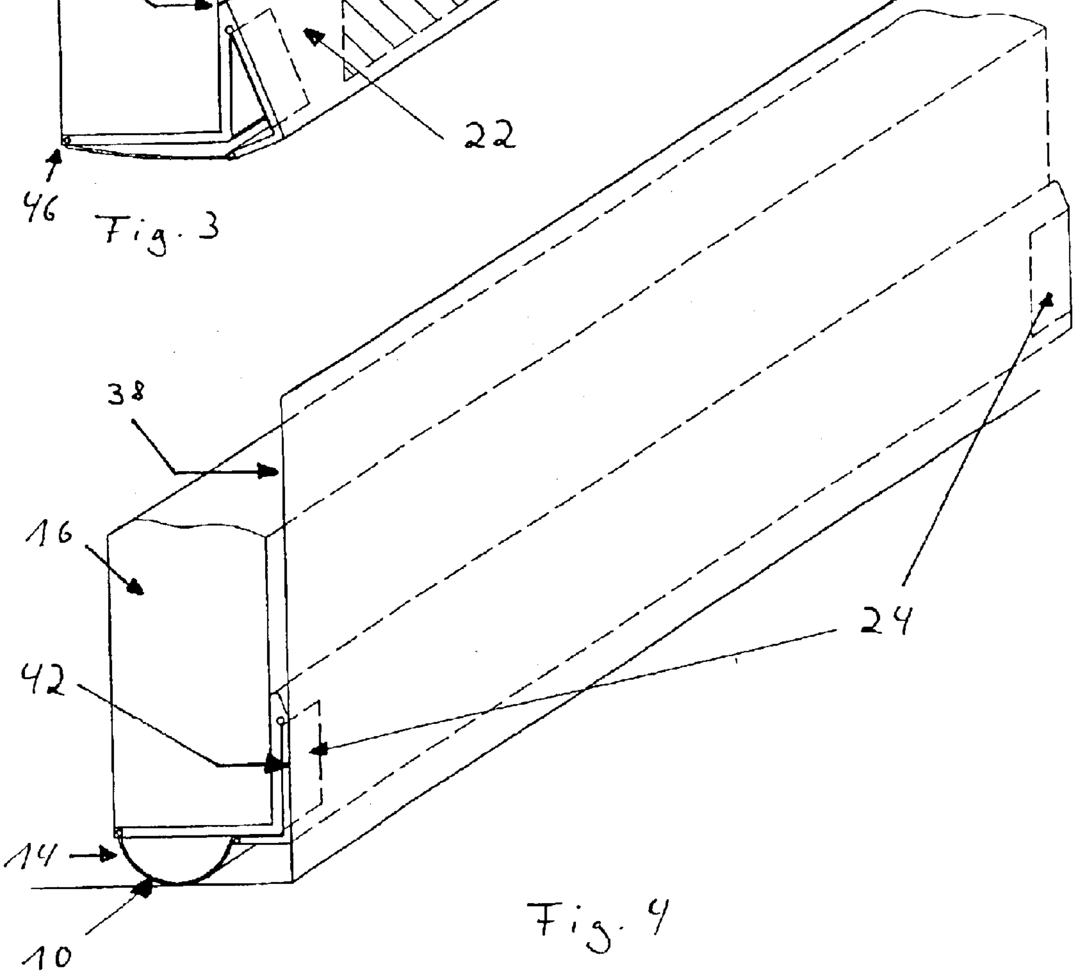
FIG. 4 shows a perspective view of a closed door having a sealing device according to the invention.

FIG. 4 also shows a door body 16 having a sealing device according to the invention, which seals gap 12 when the door is closed. In this connection, vertical shank 30 of activation rail 22 makes contact with contact surface 42 of the door frame 38 over its entire length, so that not only a gap 12 between the underside 14 of the door body 16 and floor 18, but also a gap between door body 16 and door frame 38 can be sealed with the sealing device according to the invention. The sealing device according to the invention can be used just as well to seal a gap that surrounds a window and its frame.

Figure 5:
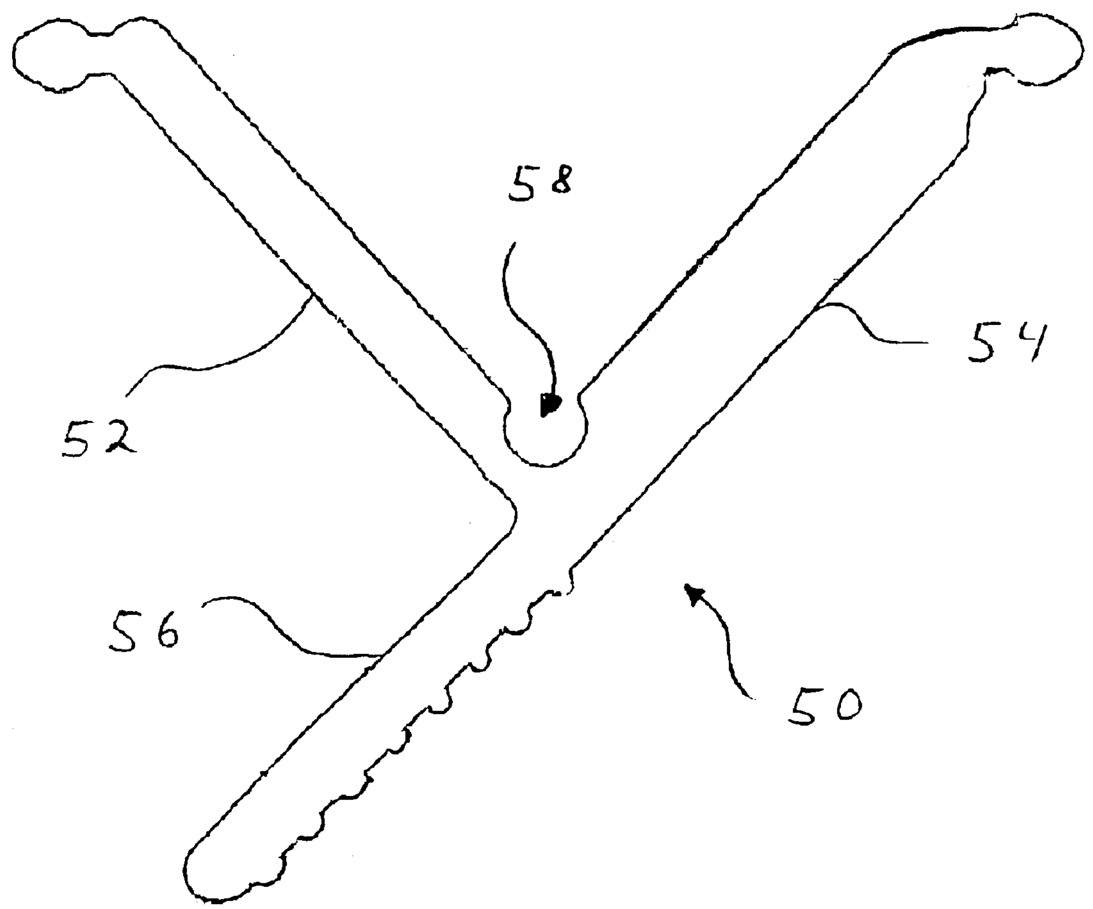
FIG. 5 shows a second exemplary embodiment of the sealing element of the invention.

FIG. 5 shows a second embodiment of a sealing element 50. Sealing element 50 has a Y-shaped profile with two upper rail elements 52, 54 and a contact seal 56 that is arranged below the two rail element 52, 54, which is structured as an extension of rail element 54. The two rail elements 52, 54 have broadened end segments at their upper ends, with which rail elements 52, 54 can be attached to the attachment rail 20 and activation rail 22, so as to pivot. Rail element 52 is connected with a center segment of rail element 54 at its lower end, by way of a film joint 58, so that the two rail elements 52, 54 are connected with one another so as to pivot, while the extended lower end of the second shank 54 forms the contact seal 56.

As a door is closed, the two upper rail elements 52, 54 are compressed in V-shape by means of the pivoting movement of the activation rail 22, and thereby the two rail elements 52, 54 are pivoted, so that the contact seal 56 that arranged on the seal element 54 is pressed into the gap and seals it.

Accordingly, while only a few embodiments of the present invention have been shown and described, it is obvious that many changes and modifications may be made thereunto without departing from the spirit and scope of the invention.

What is claimed is:

1. A device for sealing a gap between a door and a floor or between a window and a window frame, said device being attachable to the door or window, and comprising:

a deformable sealing element that is brought into a position in which said sealing element seals the gap when the door or window is closed, an activation rail attached to said sealing element and having an L-shaped cross-section, with a vertical shank and a horizontal shank, said sealing element being attached at a free end of the horizontal shank, said activation rail being in engagement with a door frame, or window frame, wherein the activation rail is pivoted when the door or window is being closed and causes the sealing element to engage the floor or window frame;

an attachment rail for affixing the sealing element to a door or window and being arranged on a first side wall of the attachment rail, said attachment rail having an L-shaped cross section, wherein the sealing element is arranged between the activation rail and a second side wall of the attachment rail, wherein the activation rail is joined to an upper end of an upright-standing shank of the attachment rail.

2. A device according to claim 1, wherein the activation rail is biased with spring force relative to the attachment rail.

3. A device according to claim 1, wherein the attachment rail can be attached to a door body or a window by means of gluing.

4. A device according to claim 1, wherein the activation rail has a length such that at least one end can be activated by contact against a door or window frame as the door or the window is closed.

5. A device according to claim 1, wherein the sealing element, the attachment rail, and the activation rail are extruded from plastic or aluminum.

6. A device according to claim 1, wherein the sealing element is domed in U-shape when the activation rail is activated.

7. A device according to claim 1, wherein the sealing element has two rail elements connected with one another so as to pivot, by means of a film joint, wherein the first rail element is attached to the attachment rail so as to pivot, and the second rail element is attached to the activation rail so as to pivot, so that when the activation rail is activated, the rail elements are pivoted into a V-shape.

8. A device according to claim 7, wherein the rail elements are connected with one another in a center segment of one of the rail elements, and that a linear extension of said one rail element forms the contact seal.

9. A device according to claim 1, wherein the activation rail and the attachment rail each have a groove, in which groove end segments of the sealing element can be attached.

10. A device according to claim 1, wherein the sealing element, the activation rail, and the attachment rail are produced in one piece.

* * * * *